United States Patent [19]

Yoshida et al.

[11] Patent Number: 4,776,667
[45] Date of Patent: Oct. 11, 1988

[54] IMAGE TRANSMISSION LINE

[75] Inventors: Kenichi Yoshida; Kimizo Ono; Koichi Tsuno, all of Osaka, Japan

[73] Assignee: Sumitomo Electric Industries, Ltd., Osaka, Japan

[21] Appl. No.: 387,896

[22] Filed: Jun. 14, 1982

[30] Foreign Application Priority Data

Jun. 20, 1981 [JP] Japan .................................. 56-95645
Jun. 20, 1981 [JP] Japan .................................. 56-95646

[51] Int. Cl.⁴ .............................................. G02B 6/06
[52] U.S. Cl. ............................................... 350/96.25
[58] Field of Search ................ 350/96.24, 96.25, 96.26

[56] References Cited

U.S. PATENT DOCUMENTS 3,780,979 12/1973 de Guillebon .................... 350/96.24
4,390,012 6/1983 Mizumoto ........................ 350/96.26

OTHER PUBLICATIONS

Driscoll, Handbook of Optics, pp. 8-44, 1979.

Primary Examiner—William L. Sikes
Assistant Examiner—Robert E. Wise
Attorney, Agent, or Firm—Sughrue, Mion, Zinn, Macpeak & Seas

[57] ABSTRACT

An image transmitting optical fiber device is improved in contrast by limiting the incident angle of light applied thereto and/or by placing an antireflection member in the light path at one or both of the ends of the device.

5 Claims, 3 Drawing Sheets

IMAGE TRANSMISSION LINE

BACKGROUND OF THE INVENTION

The present invention relates to improvements in an image transmission line using optical fibers and is intended to permit transmission of high contrast images and so forth.

One image transmission line for use in the transmission of images or patterns comprises a number of optical fiber elements bundled together in the condition that they are lined up with each other, where the optical fiber elements are composed of a core portion having a high refractive index and a cladding portion surrounding the core portion and having a low refractive index, wherein, by the difference in refractive index between the core portion and the cladding portion, light incident into the core portion is subjected repeatedly to total reflection by the boundary between the core and cladding portions whereby the light is transmitted through the core portion. The image thus transmitted is sent to the emission end where it is magnified by an image-receiving lens and converted into images suitable for direct reading, photographing with a 35 mm camera, and so forth.

At the emission end of the image transmission line 01, i.e., at the image-receiving side, as illustrated in FIG. 1, light A transmitted through the core portion 02 is subjected to Fresnel reflection and scattering by the emission end surface 03, producing noise light B. Thus, information containing light is mixed with noise light B, leading to a reduction in the contrast of the transmitted image. This phenomenon may also occur at the incident end. In the case of light B incident into the core portion 1, as shown in FIG. 1A, if the incident angle of the light B is larger than the aperture number which is determined by the structure of an optical fiber element 13, i.e., the critical angle which is determined by the difference in refractive index between the core portion 1a and the cladding portion 22, light B passes through the cladding portion 22 and leaks from the line. Also, if there is an irregularity (a), e.g., an air bubble, an impurity or the like, between the optical fiber elements, or in the boundary between the core portion 1 and the cladding portion 22, part of the leaked light is irregularly reflected, becoming noise light C which mixes with the information light transmitted through the core portion 1, thereby further reducing the contrast of the transmitted image. Furthermore, an irregularity (b) between the cladding portion and a metallic sleeve 14 provided at the incident end surface of the image transmission line will further decrease the contrast of the transmitted image.

SUMMARY OF THE INVENTION

The object of the invention is to overcome the above-described problems and to provide an image transmission line which permits transmission of high contrast images, etc. The present invention, therefore, relates to an image transmission line comprising a number of optical fiber elements bundled together in a condition such that they are aligned with one another, characterized in that at least one of the incident end surface and the emission end surface of the image transmission line is provided with contrast improving means. The contrast improving means remove those rays from the incident or emergent ends of the optical fiber bundle which can be transmitted from one optical fiber element to another. These means may consist of an anti-reflection coating applied to either end of the fibers or of an iris that limits the incident angle of the rays to the numerical aperture of the individual optical fibers.

BRIEF DESCRIPTION OF THE DRAWINGS

The present invention will hereinafter be explained in detail by reference to the accompanying drawings in which.

DETAILED DESCRIPTION OF THE PREFERRED EMBODIMENTS

Figure 1:
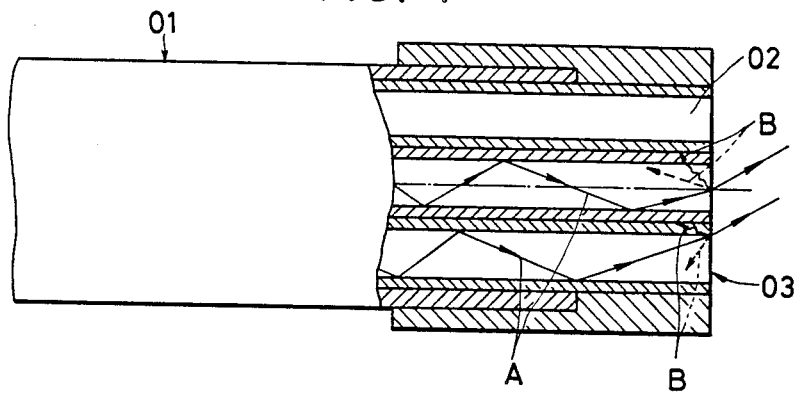
FIGS. 1 and 1A are illustrative views of light transmission in a conventional image transmission line.
Figure 1A:
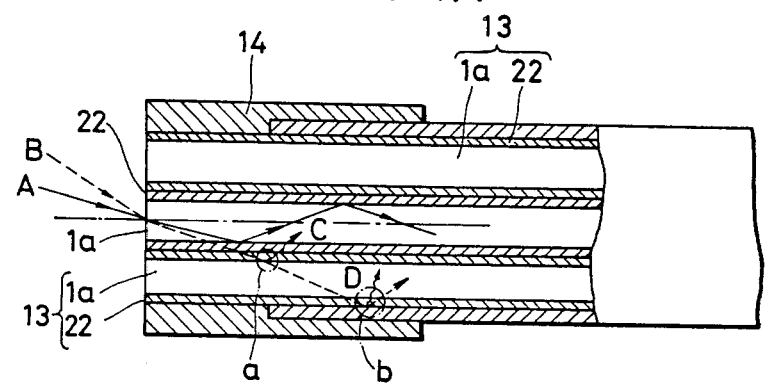
Figure 2:
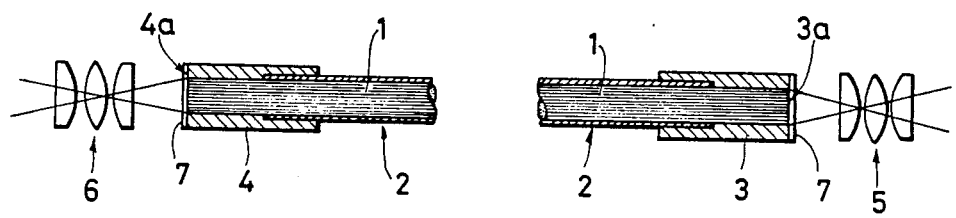
FIG. 2 is a longitudinal sectional view of one embodiment of the image transmission line of the invention.

FIG. 2 is a longitudinal sectional view of an embodiment of the image transmission line of the invention.

A number of optical fiber elements 1 are bundled together such that they are aligned with each other to form an image transmission line 2. The image transmission line 2 is provided with an image-receiving plug 3 and an image side (camera) plug 4 at either end thereof. The image-receiving plug 3 and the plug 4 are further provided with an image-receiving lens 5 and a camera lens 6, respectively, at the exterior ends thereof. At an exterior end surface 3$a$ of the image-receiving plug 3, which is an emission end surface, a commercially available anti-reflection coating 7 is coated as a reflection-preventing membrane. Also, an exterior end surface 4$a$ of the camera plug 4, which is an incident end surface, is coated with a layer of an anti-reflection coating 7. Thus, the reflection of the light reaching the top end surface 3$a$ of the image-receiving plug 3 at the emission end is prevented, and no mixing of information light with noise light will occur. Moreover, since the reflection-preventing membrane enables the inhibition of repeated reflection between the image-receiving plug 3 and the image-receiving lens 5 and between the plug 4 and the camera lens 6, information light will not mix with noise light and, therefore the contrast of the transmission image can be increased.

FIGS. 3($a$) and 3($b$) are a longitudinal sectional view and a perspective view, respectively, of an image-receiving plug portion of another embodiment of the image transmission line of the invention.

Figure 3A:
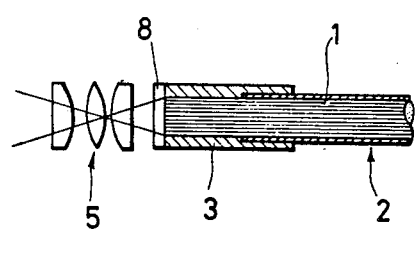
FIGS. 3($a$) and 3($b$) are a longitudinal sectional view and a perspective view, respectively, of an image-receiving side of another embodiment of the image transmission line of the invention.
Figure 3B:
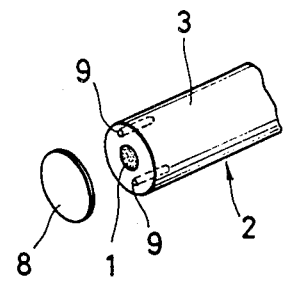

In this embodiment, the reflection-preventing membrane is not coated directly on the exterior end surface of either the image-receiving plug or the source plug, but it is first provided on the outer surface of a glass plate 8 made of quartz, for example, by a coating of of anti-reflection coating, and the glass plate 8 with the reflection-preventing membrane provided thereon is then adhered and fixed to the top end surface of the image-receiving plug or the source-side plug through a liquid (matching oil) having a refractive index which is equal or nearly equal to the refractive index of the core portion of the optical fiber element. In this adhesion-fixation procedure, when a hole or holes 9 are bored in the image-receiving plug 3 in the longitudinal direction thereof as illustrated in FIG. 3(b) and an adhesive is injected into the hole 9, the glass plate can be firmly adhered to the plug 3 and the adhesion strength can be increased. Also, a glass plate can be provided at the source plug side although the above explanation has been made with respect to an embodiment where the glass plate is provided at the image-receiving plug side.

Such provision of the reflection-preventing membrane on the glass plate 8 can produce the same results as in the above-described embodiment, in which the reflection-preventing membrane is coated directly on the top end surface of the image-receiving or source-side plug.

The contrast-improving effect in the image transmission line of the invention will hereinafter be described by reference to the following experiment.

Figure 4:
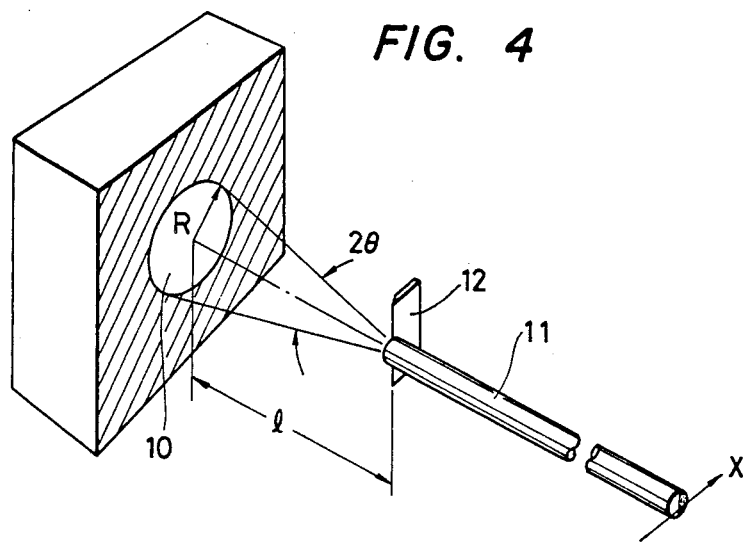
FIG. 4 is a schematic view of a testing apparatus for evaluating the contrast.
Figure 5:
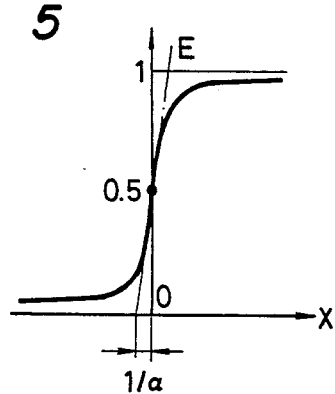
FIG. 5 is an illustrative view of an evaluation method.

In an experiment, as illustrated in FIG. 4, a diffuse light source having a uniform surface brightness and having a diameter, D (=2R), of 65 mm was employed, and, at a distance l (111 mm) from the diffuse light source, an image fiber 11 (aperture number, NA: 0.28) was placed. The aperture number of the incident light, $NA_{in}$ was set to 0.28, so as to agree with that of the image fiber 11. A glass plate with AR Coat coated thereon was adhered and fixed to the image fiber 11 at the image-receiving side thereof in the same manner as shown in FIGS. 3(a) and 3(b). In this condition, a knife edge 12 was placed at the incident end surface of the image fiber 11, and the image of the knife edge 12 was scanned in a direction x, perpendicular to the knife edge 12 at the image-receiving side, which was the emission end surface and the received light level E was measured. The value of the light intensity E was standardized to obtain a curve as shown in FIG. 5. This curve can be approximately represented by equation (1) as described hereinafter, and the contrast can be evaluated by the gradient of the approximate straight line at the rising zone (see Text No. 1086 of the Japanese Electronic Communication Association Meeting '81). Thus, the value of $1/\alpha$ (FIG. 5) was determined and the contrast was evaluated using the value $1/\alpha$.

$$x < 0 \quad \tfrac{1}{2} \cdot e^{\alpha x}$$
$$x \leqq 0 \quad 1 - \tfrac{1}{2} \cdot e^{-\alpha x} \quad (1)$$

The value $1/\alpha$ of the present image transmission line to which the glass plate with AR Coat provided thereon was fitted was measured to be 0.15 mm, whereas, on the other hand, in the conventional image transmission line with no such glass plate provided thereto, the value of $1/\alpha$ was 0.26 mm. Thus, the improvement ratio, P, represented by the equation (2) as described below, was 42%. This demonstrates that the contrast improving effect is considerably large.

$$P = \frac{(1/\alpha \text{ before improvement}) - (1/\alpha \text{ after improvement})}{(1/\alpha \text{ before improvement})} \quad (2)$$

Figure 6:
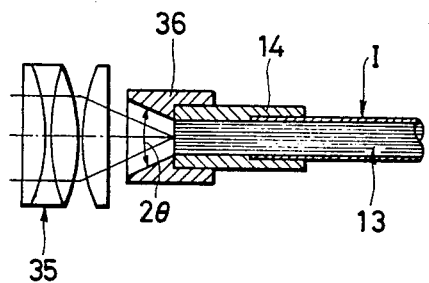
FIG. 6 is an enlarged longitudinal sectional view of the incident end portion of another embodiment of the image transmission line of the invention.

FIG. 6 is a longitudinal sectional view of an incident end portion of another embodiment of the image transmission line of the invention.

Between a camera lens 35 and the end of an optical fiber element 13 at the incident end portion of an image transmission line I is provided a hood 36 as a member for controlling the maximum incident angle of the incident light to not more than the critical angle. The hood 36 is secured to a metallic sleeve 14. In the hood 36 is bored a tapered hole which is divergent toward the exterior thereof. The taper determines the maximum incident angle of the incident light. Of the light rays incident into the image transmission line I through the camera lens 35, those rays having an incident angle greater than the numerical aperture of the image transmission line I are prevented from entering the image transmission line I by the hood 36, and only those rays having an incident angle less than the numerical aperture, i.e., less than a critical angle, are allowed to enter the image transmission line. Thus, all incident light is transmitted through the image transmission line I by repeated total reflection and, without contamination with noise light, information light can be transmitted; that is, high contrast images or the like can be transmitted to the emission end portion of the image transmission line I.

Figure 7:
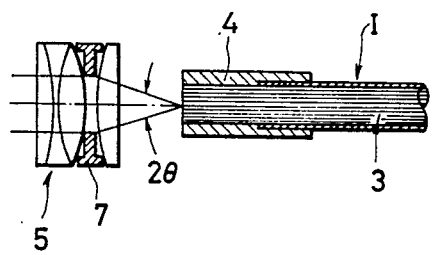
FIG. 7 is an enlarged longitudinal sectional view of the incident end portion of still another embodiment of the image transmission line of the invention.

FIG. 7 is a longitudinal sectional view of the incident end portion of another embodiment of the image transmission line of the invention.

In an image transmission line I of this embodiment, the metallic sleeve 14 is not provided with a hood, but instead, a stopping ring 37 is provided as a stopping member in the camera lens 35. According to the size of central hole diameter of the stopping ring 37, light rays incident upon the image transmission line I are limited to those rays having an incident angle less than the aperture number (critical angle), permitting transmission of high contrast images or the like.

Hereinafter, the effect obtained by controlling the incident angle to less than the critical angle of the image transmission line at the incident end surface thereof will be exaplained by reference to the following experiment.

Figure 8:
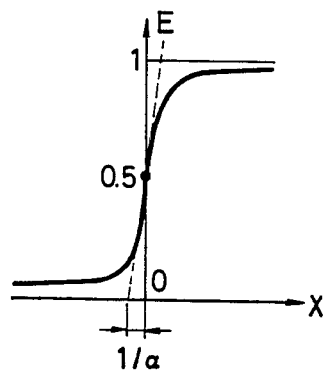
FIG. 8 is a graph obtained by standardizing experimental results.

In this experiment, also illustrated by FIG. 4, by changing the diameter R of a diffuse light source 10 having uniform surface brightness, and without the provision of a hood 36 or a stopping ring 37 as described hereinabove, the incident angle $2\theta$ to an image fiber (numerical aperture NA=0.28) was changed. The fiber was placed at a distance of 111 mm from the light source 10. In this case, the relation between the diameter R, the incident angle $2\theta$, and the numerical aperture of the incident light $NA_{in}$ (=sin $\theta$) was as shown in Table 1. By placing a knife edge 12 at the incident end surface of the image fiber 11, the image of the knife edge 12 was scanned in a direction x perpendicular to the knife edge, and the received light intensity E was measured. The values of the light intensities were standardized to obtain a curve as shown in FIG. 8.

The curve can be approximately represented by equation 1 as described hereabove, and the contrast can be evaluated as noted before. Thus, the value of $1/\alpha$ was determined and is shown in FIG. 9.

TABLE 1

| 2R (mm) | 2θ (°) | NAin |
|---|---|---|
| 20 | 10 | 0.09 |
| 45 | 22 | 0.20 |
| 65 | 32 | 0.28 |
| 90 | 44 | 0.38 |
| 180 | 80 | 0.63 |

Figure 9:
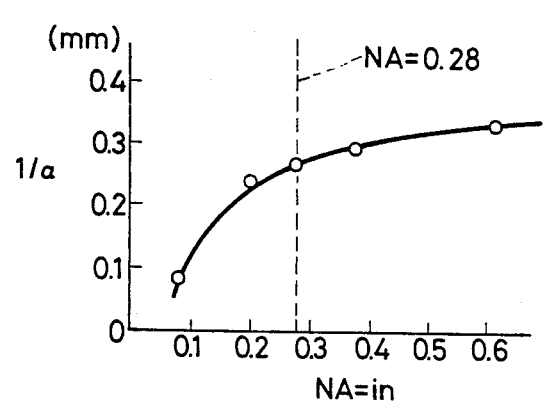
FIG. 9 is a graph showing experimental results.

In FIG. 9, the dotted line indicates the aperture number (NA=0.28) of the image fiber 11. At $Na_{in}=0.63$, $1/\alpha=0.33$ mm, and at $NA_{in}=0.28$, $1/\alpha=0.26$ mm. Thus, using the improvement ratio P as represented by equation (2) above, the improvement is 21%. Also, when $NA_{in}=0.09$, $1/\alpha=0.08$. Thus, at $NA_{in}=0.63$, the improvement ratio P=76%, and at $NA_{in}=0.28$, P=69%. It has been confirmed that the ratio P is considerably high particularly when the incident angle is not more than the numerical aperture NA of the image fiber 11.

As can be seen from the above description, when the image transmission line of the invention is employed, the contrast of the transmitted image can be improved and, furthermore, the image transmission line of the invention has a simplified structure. Thus, the image transmission line of the invention is readily applicable to conventional image transmission techniques and has excellent general-purpose properties. For example, when it is used as an image transmission line for a gastrocamera or the like, a high contrast transmission image can be obtained.

What is claimed is:

1. An image transmission line, comprising; a plurality of optical fiber elements bundled together and aligned with each other, wherein at least one of the incident end surface and the emergent end surface of the image transmission line is provided with means for removing light rays which can be transmitted between said optical fiber elements and which thereby reduce the contrast of the transmitted image, wherein said means comprises a stopping member for controlling the maximum incident angle of incident light to a value not more than the numerical aperture of the image transmission line at the incident end surface thereof.

2. The image transmission line as claimed in claim 1, said stopping member comprising an end piece fixed to an incident end surface of said transmission line, and having an angular surface encompassing a solid angle related to said maximum incident angle, and centered about said incident end surface.

3. The image transmission line as claimed in claim 1, said stopping member comprising a stop ring associated with a lens group arranged in front of said incident end surface of said transmission line.

4. An image transmission line, comprising; a plurality of optical fiber elements bundled together and aligned with each other, wherein at least one of the incident end surface and the emergent end surface of the image transmission line is provided with means for removing light rays which can be transmitted between said optical fiber elements and which thereby reduce the contrast of the transmitted image, wherein said means comprises a reflection-preventing membrane provided at at least one of the incident end surface and the emergent end surface of the image transmission line and wherein said membrane is applied to a glass plate, said plate being affixed to at least one end of said transmission line through a matching liquid.

5. An image transmission line, comprising; a plurality of optical fiber elements bundled together and aligned with each other, wherein the image transmission line is provided at the incident end portion thereof with aperture controlling means for controlling the maximum incident angle of incident light to a value not more than the numerical aperture of the image transmission line or less.

* * * * *